United States Patent Office

2,927,134
Patented Mar. 1, 1960

2,927,134

PREPARATION OF CYCLOHEXENONE DERIVATIVES

Henri Normant, Paris, France, assignor to Societe des Usines Chimiques Rhone-Poulenc, Paris, France, a French body corporate No Drawing. Application January 24, 1957
Serial No. 635,967

Claims priority, application France February 1, 1956

5 Claims. (Cl. 260—586)

The present invention relates to cyclohexanone derivatives and more particularly to the production of 3-(alk-1'-enyl)cyclohex-2-ene-1-ones, conforming to the general Formula I:

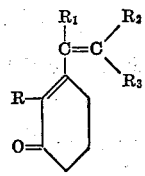

wherein R represents a hydrogen atom or a lower alkyl radical and $R_1$, $R_2$ and $R_3$ represent hydrogen atoms or lower alkyl or aryl radicals, and to new compounds of that series. By "lower alkyl radical" is meant a radical containing at most 4 carbon atoms.

A single member of the series thus defined has been described in the literature, namely 2-methyl-3-ethenyl-cyclohex-2-ene-1-one, which constitutes an important intermediate product in the preparation of physiologically active substances, more especially for the synthesis of steroids and related products (Eschenmoser, Schreiber and Julia, Helv. Chim. Acta, 36, 482, 1953). The method of preparation described by these authors consists in converting 2-methyl-3-isobutoxycyclohex-2-ene-1-one (obtained from 2-methyldihydroresorcinol) to give 2-methyl-3-ethinylcyclohex-2-ene-1-one which, on controlled catalytic hydrogenation, gives 2-methyl-3-ethenyl-cyclohex-2-ene-1-one.

Although such a method of operation can be applied to the preparation of compounds of the foregoing general formula wherein $R_1$, $R_2$ and $R_3$ are hydrogen atoms it cannot be applied to the production of compounds of general Formula I in which $R_1$ is not a hydrogen atom, regardless of the significance of $R_2$ and $R_3$. Moreover, the controlled hydrogenation of a compound containing a triple (acetylenic) bond, to convert the latter into a double (ethylenic) bond necessitates the application of special measures in order to avoid the hydrogenation proceeding beyond the desired stage.

According to the present invention a process for directly producing compounds of the general Formula I comprises reacting an enolic ether of the general Formula II:

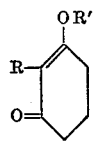

R having the significance given above, and R' representing a lower aliphatic radical comprising from 3 to 5 carbon atoms with an alk-1-enyl-magnesium halide of general Formula III:

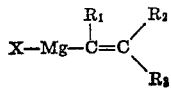

where X represents a chlorine or bromine atom and the radicals $R_1$, $R_2$ and $R_3$ have the significance given above, and decomposing the ethylenic magnesium derivative formed in known manner, for example, by sulphuric acid hydrolysis.

Preferably the radical R' has a branched chain e.g., isobutyl or isoamyl.

The alk-1-enyl-magnesium halide is conveniently prepared by the reaction of the alk-1-enyl halide of the formula:

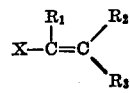

and magnesium in a cyclic ether solvent, such as tetrahydrofuran, methyltetrahydrofuran or tetrahydropyran, at moderate temperature and preferably in the presence of a trace of iodine. The enolic ether is added gradually to the solution of the organomagnesium compound obtained, any substantial increase of temperature being avoided. When the addition is complete, it may be advantageous to effect a moderate heating in order to complete the reaction. The reaction mixture is then hydrolyzed by dilute sulphuric acid and the desired product is isolated from the medium in which it has formed by methods known per se, e.g., extraction, distillation, rectification.

New compounds produced by the present invention are those of the general formula:

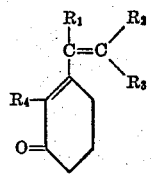

where $R_4$ is an alkyl group containing 2 to 4 carbon atoms and the other symbols have the meanings assigned to them above, and those of the same general formula in which there is no $R_4$ substituent.

The following examples will serve to illustrate the invention but are not to be regarded as limiting the invention in any way:

*Example I*

To 14.4 g. of vinyl-magnesium bromide, prepared by reacting magnesium with vinyl bromide in tetrahydrofuran, are gradually added, with simultaneous cooling, 18.3 g. of 2-methyl-3-isobutoxycyclohex-2-ene-1-one. The mixture is then left for 2 hours and afterwards heated on a water bath for 1 hour.

The product formed is decomposed by addition of an excess of dilute sulphuric acid. The aqueous layer is extracted with ether. The organic layers are combined and washed with 10% by weight sodium carbonate and dried over potassium carbonate.

After elimination of the solvents, the product is distilled in a medium vacuum to recover the liberated isobutanol. The residual oil is then distilled under a high vacuum.

There are thus obtained 7.4 g. of 2-methyl-3-ethenyl-cyclohex-2-ene-1-one; B.P./0.15 mm. Hg=56–57° C.; $d_{21}=0.998$: $n_D^{21}=1.5519$, from which it is possible to prepare a 2:4-dinitrophenylhydrazone as red crystals, M.P. 181° C. The yield is 76%.

*Example II*

By proceeding as in Example I, but starting with 65.5 g. of vinyl-magnesium bromide and 55.7 g. of 3-isobutoxycyclohex-2-ene-1-one, there are obtained, in a yield of 90%, 37 g. of 3-ethenylcyclohex-2-ene-1-one in the form of a yellow oil which polymerizes readily. It has the following constants: B.P.$_{0.1}$=50° C.; B.P./12 mm. Hg=95–96° C.; $d_{19}$=1.002; $n_D^{19}$=1.5508.

The product gives two red 2:4-dinitrophenylhydrazones, which are separated by utilizing their difference of solubility in alcohol and which melt at 192° and 198° C. respectively.

The starting 3-isobutoxycyclohex-2-ene-1-one is obtained in a yield of 91% from dihydroresorcinol by the general procedure described by Eschenmoser et al. (loc. cit.). This product has the following constants: B.P./0.05 mm. Hg=77.5° C.; B.P/0.7 mm. Hg=97° C.; M.P.=+15° C.; $n_D^{16.2}$=1.4942.

The new products of the present invention, i.e., those other than 2-methyl-3-ethenylcyclohex-2-ene-1-one, may be employed analogously to that compound in the synthesis of steroids and related compounds.

I claim:
1. A process for the preparation of 3-(alk-1'-enyl)-cyclohex-2-ene-1-ones of the general formula:

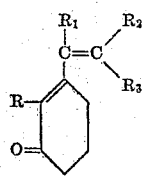

wherein R is selected from the group consisting of the hydrogen atom and alkyl radicals containing at most 4 carbon atoms and R$_1$, R$_2$ and R$_3$ are each selected from the group consisting of the hydrogen atom, alkyl radicals containing at most 4 carbon atoms, which comprises reacting magnesium with a solution in a cyclic ether solvent of an ethylenic compound of the general formula:

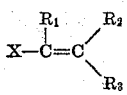

where X is selected from the class consisting of chlorine and bromine atoms and the radicals R$_1$, R$_2$, R$_3$ have the significance given above, condensing the ethylenic organomagnesium derivative thus obtained with an enolic ether of the general formula:

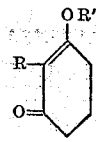

R having the significance given above and R' representing a lower aliphatic radical comprising from 3 to 5 carbon atoms, and decomposing with dilute acid the magnesium complex thus obtained.

2. A process according to claim 1 wherein the decomposition of the magnesium derivative is effected by treatment with dilute sulphuric acid.

3. A process according to claim 1 wherein the reactants are mixed together while avoiding any substantial increase in temperature, allowed to stand and then warmed.

4. A process according to claim 1 wherein R' is an isobutyl radical.

5. A process according to claim 1 wherein R' is an isoamyl radical.

References Cited in the file of this patent

UNITED STATES PATENTS 2,734,091    Londergan _____ Feb. 7, 1956
2,855,397    Ramsden _____ Oct. 7, 1958

OTHER REFERENCES

Knoevenagel et al.: Ber. Deut. Chem., vol. 39, page 3444 (1906).

Woods: J. Am. Chem. Soc., vol. 69, pp. 2549–52 (1947).

Eschenmoser et al.: Helv. Chim. Acta, vol. 36, p. 483 (1953).